US008648851B2

(12) United States Patent
Lee

(10) Patent No.: US 8,648,851 B2
(45) Date of Patent: Feb. 11, 2014

(54) LIQUID CRYSTAL DISPLAY DEVICE

(75) Inventor: Jung Hyun Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 156 days.

(21) Appl. No.: 12/612,259

(22) Filed: Nov. 4, 2009

(65) Prior Publication Data

US 2010/0123710 A1 May 20, 2010

(30) Foreign Application Priority Data

Nov. 18, 2008 (KR) ........................ 10-2008-0114912

(51) Int. Cl.
*G09G 5/00* (2006.01)
*H02H 3/00* (2006.01)
*H02B 1/00* (2006.01)

(52) U.S. Cl.
USPC ................................ 345/214; 361/1; 361/600

(58) Field of Classification Search
USPC ....................................... 345/214; 361/1, 600
See application file for complete search history.

(56) References Cited

U.S. PATENT DOCUMENTS 7,993,730 B2 * 8/2011 Ayukawa ...................... 428/194
2009/0322983 A1 * 12/2009 Hashino .......................... 349/61

FOREIGN PATENT DOCUMENTS

KR 10-2008-0002122 A 1/2008

OTHER PUBLICATIONS

Office Action dated Feb. 21, 2013 from the Korean Patent Office in counterpart Korean Application No. 10-2008-0114912.

* cited by examiner

*Primary Examiner* — Waseem Moorad
(74) *Attorney, Agent, or Firm* — Morgan, Lewis & Bockius LLP

(57) ABSTRACT

An LCD device having improved reliability is disclosed. The LCD device includes an LCD panel comprising a plurality of gate lines and a plurality of data lines crossing the plurality of gate lines, a bottom cover disposed under the LCD panel, a top case encompassing an edge portion of an upper surface of the LCD panel and coupled to the bottom cover, a control PCB disposed on a lower surface of the bottom cover, a data driving PCB disposed at a side of the LCD panel and supplying a data signal to the plurality of data lines, a plurality of chip-on-films (COFs) connected the data driving PCB and the LCD panel, a plurality of flexible flat cables (FFCs) connected the data driving PCB and the control PCB, and a protection tape in which an adhesive material is coated on a surface other than areas corresponding to the FFCs and a plurality of grooves corresponding to the FFCs are formed at a side of the protection tape.

10 Claims, 2 Drawing Sheets

LIQUID CRYSTAL DISPLAY DEVICE

CROSS-REFERENCE TO RELATED APPLICATION

This application claims priority under 35 U.S.C. 119 to Korean Patent Application No. 10-2008-0114912, filed on Nov. 18, 2008, which is hereby incorporated by reference in its entirety.

BACKGROUND

1. Field of the Disclosure

This disclosure relates to a liquid crystal display (LCD) device having improved reliability.

2. Description of the Related Art

Cathode ray tubes (CRTs), one of widely used display devices, are mainly used as TVs or monitors for measuring apparatuses or information terminals. However, the heavy weight and large size of the CRT have been major hindrance in the manufacturing of small and light electronic products.

As a solution to the above problem, LCD devices are gradually used in a wide range of application fields due to their advantages such as lightness, thinness, and low power consumption driving. Accordingly, the LCD device is being manufactured to have a larger screen, to be thinner, and to consume lower power.

The LCD device displays an image by controlling the amount of light transmitting liquid crystal. Since the LCD device is not a self-illuminating display device unlike the CRT, a backlight unit including a separate light source providing light is provided on a rear surface of an LCD panel to visually present an image.

The LCD panel is supported by a panel guide that is coupled to a bottom cover of the backlight unit. The LCD panel includes a gate drive PCB on which a gate drive unit for supplying a gate signal to a gate line is mounted and a data drive PCB for supplying a data signal to a data line. The gate drive PCB and the data drive PCB are electrically connected to the LCD panel via a chip-on-film (COF) that is connected to an edge of the LCD panel. Also, the gate drive PCB and the data drive PCB are electrically connected to a control PCB provided on a lower surface of the backlight unit via a flexible flat cable (FFC).

In a general LCD device, to protect the FFC from an external shock, a protection tape having a surface on which an adhesive material is coated is attached to an area corresponding to the FFC. In detail, the protection tape of a general LCD device is attached to a top case and a bottom case corresponding to a peripheral area of the FFC to cover the FFC.

However, since the protection tape firmly fixes the FFC to the bottom cover and the top case in the general LCD device, the FFC is restricted by the protection tape so that the data drive PCB connected to the FFC may be prevented from being moved. Thus, during a vibration test of the LCD device, short-circuit may be generated in the data drive PCB and the COF connected to the LCD panel, due to a shock by vibrations.

BRIEF SUMMARY

Accordingly, the present embodiments are directed to an LCD device that substantially obviates one or more of problems due to the limitations and disadvantages of the related art.

An object of the embodiment of the present disclosure is to provide an LCD device having improved reliability.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

According to one general aspect of the present embodiment, an LCD device comprises an LCD panel comprising a plurality of gate lines and a plurality of data lines crossing the plurality of gate lines, a bottom cover disposed under the LCD panel, a top case encompassing an edge portion of an upper surface of the LCD panel and coupled to the bottom cover, a control PCB disposed on a lower surface of the bottom cover, a data driving PCB disposed at a side of the LCD panel and supplying a data signal to the plurality of data lines, a plurality of chip-on-films (COFs) connected the data driving PCB and the LCD panel, a plurality of flexible flat cables (FFCs) connected the data driving PCB and the control PCB, and a protection tape in which an adhesive material is coated on a surface other than areas corresponding to the FFCs and a plurality of grooves corresponding to the FFCs are formed at a side of the protection tape.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION

Figure 1:
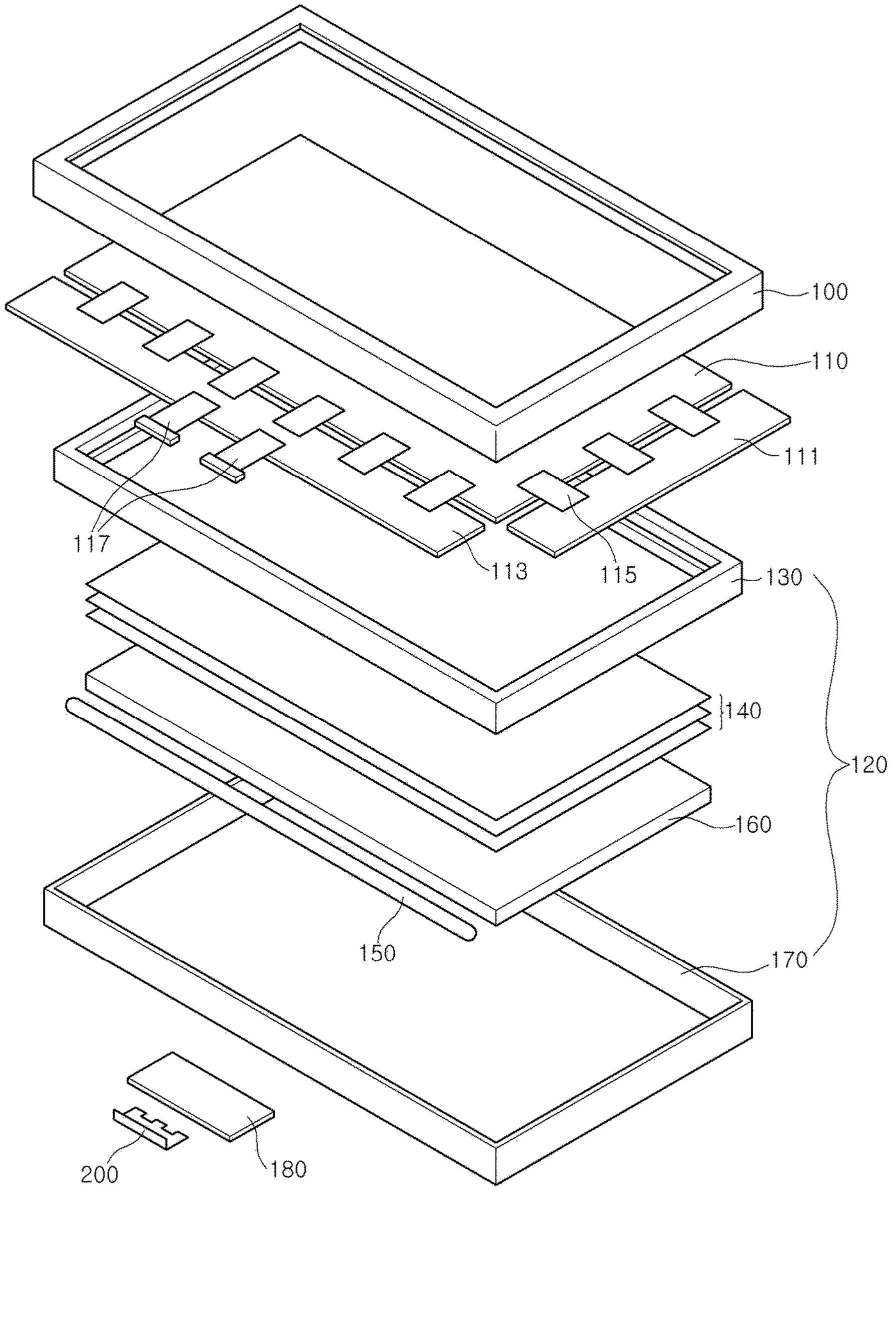
FIG. 1 is an exploded perspective view of an LCD device according to an embodiment of the present disclosure.

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. Also, the size and thickness of the device might be expressed to be exaggerated for the sake of convenience in the drawings. Wherever possible, the same reference numbers will be used throughout this disclosure including the drawings to refer to the same or like parts.

Figure 2:
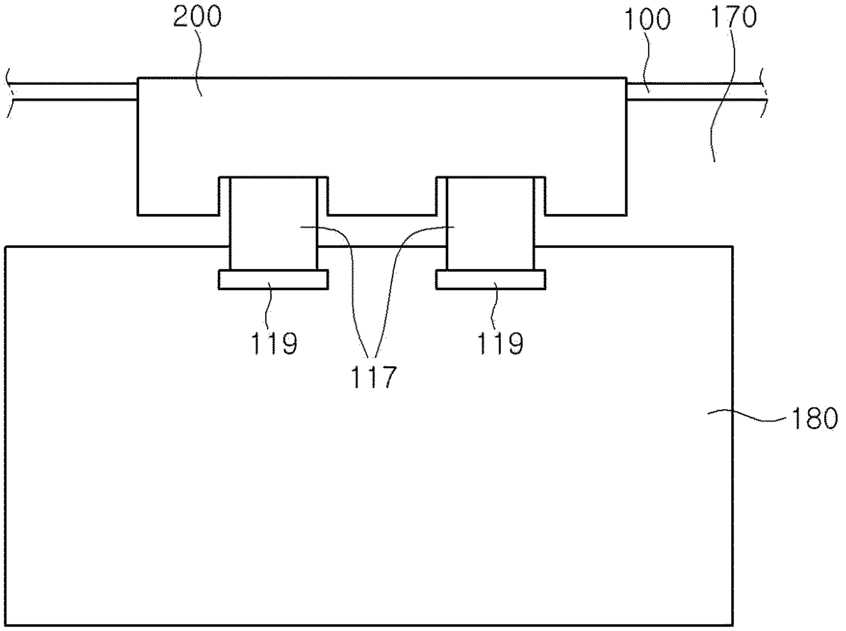
FIG. 2 illustrates an area of a low surface of a bottom cover, where the system drive PCB of FIG. 1 is disposed.
Figure 3:
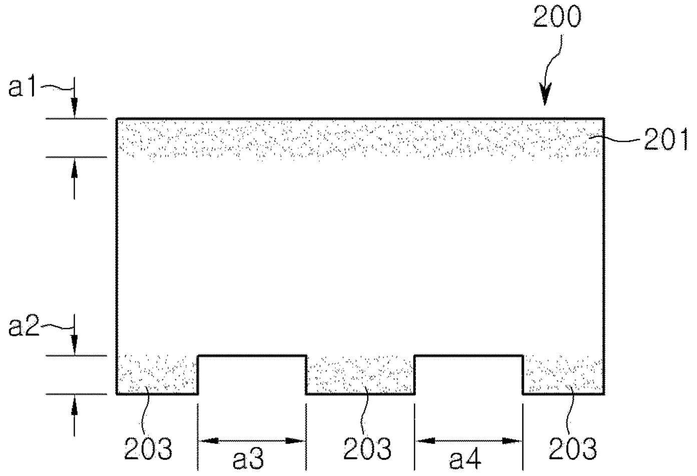
FIG. 3 is a plan view of a protection tape according to an embodiment of the present disclosure.

FIG. 1 is an exploded perspective view of an LCD device according to an embodiment of the present disclosure. FIG. 2 illustrates an area of a low surface of a bottom cover, where the system drive PCB of FIG. 1 is disposed. FIG. 3 is a plan view of a protection tape according to an embodiment of the present disclosure.

Referring to FIGS. 1 and 2, an LCD device according to the present embodiment includes an LCD panel 110 for displaying an image and a backlight unit 120 disposed under the LCD panel 110 to provide light. Also, the LCD device further includes a top case 100 that encompasses an edge portion of an upper surface of the LCD panel 110 and is fixed to the backlight unit 120.

Although it is not shown in detail in the drawings, the LCD panel 110 includes a thin film transistor (TFT) substrate and a color filter substrate which are combined together, facing each other and maintaining a uniform cell gap therebetween, and a liquid crystal layer interposed between the TFT substrate and the color filter substrate. In the TFT substrate, a plurality of gate lines are formed, a plurality of data lines crossing the gate lines are formed, and a TFT is formed in each intersection between the gate liens and the data lines.

A gate driving printed circuit board (PCB) 111 for supplying a scan signal to the gate line and a data driving printed circuit board (PCB) 113 for supplying a data signal to the data line are provided at the edge portion of the LCD panel 110. The gate driving PCB 111 and the data driving PCB 113 are electrically connected to the LCD panel 100 via a chip-on-film (COF) 115. The COF 115 may be changed to a tape carrier package (TCP).

The backlight unit 120 includes a bottom cover 170 having an open upper surface, at least one light source 150 provided on an inner side surface of the bottom cover 170, a light guide plate 160 disposed parallel to the light source 150 for converting light output from the light source to a surface light, and optical sheets 140 disposed on the light guide plate 160 to focus and diffuse the light. The backlight unit 120 may further include a support main 130 seated in the bottom cover 170 to accommodate the light source 150, the light guide plate 160, and the optical sheets 140. Although it is not shown in the drawings, the backlight unit 120 may further include a reflection sheet provided to contact the inner surface of the bottom cover 170 to reflect the light output from the light guide plate 160 to proceed toward the LCD panel 110.

The light guide plate 160 is formed of a polymethyl-methacrylate (PMMA) material. Although it is not shown in detail in the drawings, the light guide plate 160 has a wedge shape such that the thickness of an end portion of the light guide plate 160 opposite to an incident surface where the light source 150 is disposed may decrease. A prism pattern for refracting the incident light toward the optical sheets 140 may be formed on the rear surface of the light guide plate 160.

The optical sheets 140 includes a diffuser sheet for diffusing an incident light, a focusing sheet for focusing an incident light, and a protection sheet for protecting the focusing sheet. The light source 150 may be a light emitting diode (LED) as a point light source in addition to a lamp. A guide portion that encompasses the light source 150 to guide the light output from the light source 150 toward the light guide plate 160 may be further provided.

A control PCB 180 is disposed on a lower surface of the bottom cover 170. Although it is not shown in detail, the control PCB 180 includes a timing controller, an electrically erasable programmable read-only memory (EEPROM), a DC-to-DC converter, and wirings. The control PCB 180 is connected to the data driving PCB 113 via a plurality of flexible flat cables (FFCs) 117. Each of the FFCs 117 has a connection terminal 119 at an end portion thereof and is connected to the control PCB 180.

The protection tape 200 is attached to one side surface of the top case 100 and the lower surface of the bottom cover 170, thus protecting the FFCs 117. The protection tape 200 has a function to protect the FFCs 117. A groove is formed in an area corresponding to each of the FFCs 117 at a side of the protection tape 200.

Referring to FIG. 3, the protection tape 200 includes a first area a1 at one end thereof to be attached to the top case 100 and a second area a2 at the other end thereof to be attached to the bottom cover 170. A first adhesive material 201 is coated in the first area a1 used for the adhesion to the top case 100 while a second adhesive material 203 is coated in the second area a2 used for the adhesion to the bottom cover 170. The first and second adhesive materials 201 and 203 are substantially the same material.

Third and fourth areas a3 and a4 having a groove shape are formed in areas corresponding to the FFCs 117 of the second area a2. The third and fourth areas a3 and a4 are formed by removing the second area a2 where the second adhesive material 203 is coated. For convenience of explanation, the removed areas are referred to as the third and fourth areas a3 and a4. Each of the third and fourth areas a3 and a4 is formed larger than the width of each of the FFCs 117. When the width of each of the FFCs 117 is changed according to the size and model of the LCD device, the sizes of the third and fourth areas a3 and a4 are changed accordingly In a method of manufacturing the protection tape 200 according to the present disclosure, the first and second adhesive materials 201 and 203 are coated in the first and second areas a1 and a2 corresponding to each other on a surface type insulation film. Areas corresponding to the FFCs 117 are removed from the second area a2 so that the third and fourth areas a3 and a4 having a groove shape may be formed.

As describe above, in the LCD device according to the present embodiment, the protection tape 200 for protecting the FFCs 117 that connect the data driving PCB 113 and the control PCB 180 not only has a function of protecting the FFCs 117 but also has a structure not restricting the FFCs 117. Thus, the generation of short-circuit of the COF 115 because the data driving PCB 113 is restricted by the FFCs 117 may be avoided.

That is, the protection tape 200 of the present embodiment has a structure not restricting the FFCs 117 so that the data driving PCB 113 may freely move during a bra vibration test process of the LCD device. As such, an image badness caused by a broken wire of the COF 115 is prevented. Therefore, reliability of the LCD device may be improved.

It will be apparent to those skilled in the art that various modifications and variations can be made in the present disclosure. Thus, it is intended that the present disclosure cover the modifications and variations of this embodiment provided they come within the scope of the appended claims and their equivalents.

What is claimed is:

1. An LCD device, comprising:

an LCD panel including a plurality of gate lines and a plurality of data lines crossing the plurality of gate lines;

a bottom cover under the LCD panel;

a top case encompassing an edge portion of an upper surface of the LCD panel and coupled to the bottom cover;

a control PCB disposed on a lower surface of the bottom cover;

a data driving PCB disposed at a side of the LCD panel and supplying a data signal to the plurality of data lines;

a plurality of chip-on-films configured to connect the data driving PCB and the LCD panel;

a plurality of flexible flat cables configured to connect the data driving PCB and the control PCB, the flexible flat cables being disposed from the lower surface of the bottom cover to a side surface of the top case; and a protection tape includes:

a first area opposite to the side surface of the top case attached to the top case, a second area opposite to a lower surface of the bottom cover attach to the bottom surface of the bottom cover, and a plurality of third areas correspond to a plurality of grooves which are formed on the second area, the plurality of grooves being formed corresponding to the plurality of flexible flat cables at a side of the protection tape and an adhesive material being formed between the plurality of grooves, wherein the grooves are formed by removing a part of side surface of the protection tape, wherein the adhesive material only is coated on the first and second areas of the protection tape, wherein the flexible flat cables are covered with the protection tape, and wherein a height of the adhesive material coated on the second area is the same as a depth of the groove.

2. The LCD device claimed as claim 1, wherein the plurality of third areas are the same number as the plurality of flexible flat cables.

3. The LCD device claimed as claim 1, wherein the plurality of third areas are prepared by partially eliminating the second area.

4. The LCD device claimed as claim 1, wherein the adhesive material is not coated on the plurality of third areas.

5. The LCD device claimed as claim 1, wherein the third area has a width lager than that of each of the flexible flat cables.

6. An LCD device, comprising:

an LCD panel configured to include a plurality of gate lines and a plurality of data lines crossing each other;

a bottom cover disposed under the LCD panel;

a top case configured to encompass edges of an upper surface of the LCD panel and coupled to the bottom cover;

a control PCB disposed on a lower surface of the bottom cover;

a data driving PCB disposed at a side of the LCD panel and configured to supply data signals to the plurality of data lines;

a plurality of chip-on-films configured to connect the data driving PCB with the LCD panel;

a plurality of flexible flat cables configured to connect the data driving PCB with the control PCB, the flexible flat cables being disposed from lower surface of the bottom cover to side surface of the top case; and a protection tape configured to movably fasten the plurality of flexible flat cables to the bottom cover, wherein the protection tape includes:

a first area opposite to the side surface of the top case attached to the top case, a second area opposite to a lower surface of the bottom cover attach to the bottom surface of the bottom cover, and a plurality of third areas correspond to a plurality of grooves which are formed on the second area, wherein the plurality of grooves are formed by removing a part of side surface of the protection tape, wherein the adhesive material only is coated on the first and second areas of the protection tape, wherein the flexible flat cables are covered with the protection tape, and wherein a height of the adhesive material coated on the second area is the same as a depth of the groove.

7. The LCD device claimed as claim 6, wherein the plural third areas are the same number as the plurality of flexible flat cables.

8. The LCD device claimed as claim 6, wherein the plurality of third areas are prepared by partially eliminating the second area.

9. The LCD device claimed as claim 6, wherein the adhesive material is not coated on the plurality of third areas.

10. The LCD device claimed as claim 6, wherein the third area has a width lager than that of each of the flexible flat cables.

* * * * *